United States Patent
Froeschl et al.

(10) Patent No.: US 6,813,727 B2
(45) Date of Patent: Nov. 2, 2004

(54) CONTROL UNIT HAVING A MAIN MICROPROCESSOR AND HAVING A PROCESSOR INTERFACE TO A BUS TRANSCEIVER UNIT

(75) Inventors: Joachim Froeschl, Seefeld (DE); Josef Krammer, Holzkirchen (DE); Anton Schedl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 524 days.

(21) Appl. No.: 09/884,480

(22) Filed: Jun. 20, 2001

(65) Prior Publication Data

US 2002/0019915 A1 Feb. 14, 2002

(30) Foreign Application Priority Data

Jun. 20, 2000 (DE) .......................... 100 30 158

(51) Int. Cl.[7] .............................................. G06F 11/00
(52) U.S. Cl. .............................. 714/10; 714/42; 714/43; 714/54; 710/53; 710/55
(58) Field of Search ............................. 714/10, 52, 21, 714/712, 718, 54, 49, 42, 43, 56; 710/52, 55, 53, 56

(56) References Cited

U.S. PATENT DOCUMENTS

| | | | | |
|---|---|---|---|---|
| 4,347,609 A | * | 8/1982 | Fukuyama et al. | ......... 714/750 |
| 4,571,672 A | | 2/1986 | Hatada et al. | .............. 364/200 |
| 5,271,020 A | * | 12/1993 | Marisetty | ..................... 714/746 |
| 5,617,433 A | * | 4/1997 | Suzuki | ........................ 714/799 |
| 5,666,480 A | * | 9/1997 | Leung et al. | .................. 714/1 |
| 5,838,900 A | * | 11/1998 | Horvath et al. | ............... 714/56 |
| 6,154,796 A | * | 11/2000 | Kuo et al. | ..................... 710/52 |
| 6,356,584 B1 | * | 3/2002 | Cuylen | ....................... 375/221 |
| 6,493,773 B1 | * | 12/2002 | Daniel et al. | ................. 710/52 |
| 6,601,191 B1 | * | 7/2003 | Norman et al. | ............... 714/37 |
| 6,604,154 B1 | * | 8/2003 | Takegami et al. | ............. 710/52 |

FOREIGN PATENT DOCUMENTS

| | | |
|---|---|---|
| EP | 0 347 082 A2 | 6/1989 |
| EP | 0 669 581 A2 | 6/1989 |
| JP | 63-124161 | 5/1988 |

OTHER PUBLICATIONS

German Search Report and translation of pertinent portions thereof.

* cited by examiner

Primary Examiner—Robert Beausoliel
Assistant Examiner—Yolanda L Wilson
(74) Attorney, Agent, or Firm—Crowell & Moring LLP

(57) ABSTRACT

A control unit has a main microprocessor and processor interface to a bus transceiving unit, which has at least one transmit memory, one receive memory and one bus controller. Devices are provided by which the data content of the transmit memory and/or of the receive memory is reset to a defined status after each output and/or reading-in of the data stored in either memory, and before the main microprocessor outputs and/or reads in new data.

16 Claims, 2 Drawing Sheets

CONTROL UNIT HAVING A MAIN MICROPROCESSOR AND HAVING A PROCESSOR INTERFACE TO A BUS TRANSCEIVER UNIT

BACKGROUND AND SUMMARY OF THE INVENTION

This application claims the priority of German patent document 100 30 158.4, filed 20 Jun. 2000, the disclosure of which is expressly incorporated by reference herein.

The invention relates to an electronic control unit having a main microprocessor and a processor interface to a bus transceiver unit. Such a control unit is used, for example, in motor vehicles for transmission of motor-vehicle-related data via a data bus (for example, a CAN bus, German Patent Document DE 35 06 118 A).

In known bus systems of this type, for example, the main microprocessor of a control unit that is a bus subscriber, outputs a transmit instruction to the bus controller for the output of the data filed in the transmit memory after first giving a command to transmit defined data into the transmit memory. No check of the data content currently stored in the transmit memory (for example, with respect to its validity and current status), has taken place. Although bus systems are known which, together with useful data, additionally send a counter reading or so-called "toggle bits" in order to detect the current status of the data, additional memory space is required for this purpose. A comparable problem exists concerning the data content of the receive memories.

It is an object of the invention to prevent in a simple and cost-effective manner the transmission and receipt of apparently valid data by way of a bus.

This and other objects and advantages are achieved by the control method and apparatus according to the invention, in which after each output and/or read-in of stored data, the data content of the transmit memory and/or of the receive memory is reset to a defined status in the form of a "resetting" before the main microprocessor outputs and/or reads in new data. This "resetting" takes place, for example, by assigning a defined "invalidity labeling" to the memory content. The resetting of the data content takes place either by the main microprocessor (preferably by means of software) or by the usually simpler bus controller (preferably by means of hardware). In particular, the reset must be carried out before a new transmit or receive instruction is output by the main microprocessor.

Should the data not have been updated (for example, because of a defective path or a defective memory), during the next transmit or receive instruction either the data content is automatically transmitted corresponding to the defined status of the transmit or receive memory (so that the receivers of the data recognize that no valid data are present), or the output or reading-in of the data is prevented completely.

After resetting, preferably, for example, the main microprocessor checks whether the data content does in fact correspond to the defined status. (A prerequisite is a basically existing read-back path.) When the defined status does not exist, a defect is detected and preferably stored. In addition, when this defect is present, a future transmit or receive instruction can be prevented.

Before the next output of data from the transmit memory to the bus and/or before the next reading-in of data from the receive memory, a check can be made whether the defined status ("invalidity labeling") is present. If so, output and/or reading-in of data is preferably prevented.

By virtue of the invention, no additional memory location in the area of the useful data is required for protecting the data, and resetting of the data takes place automatically independently of the application of the data.

Other objects, advantages and novel features of the present invention will become apparent from the following detailed description of the invention when considered in conjunction with the accompanying drawings.

DETAILED DESCRIPTION OF THE DRAWINGS

Figure 1:
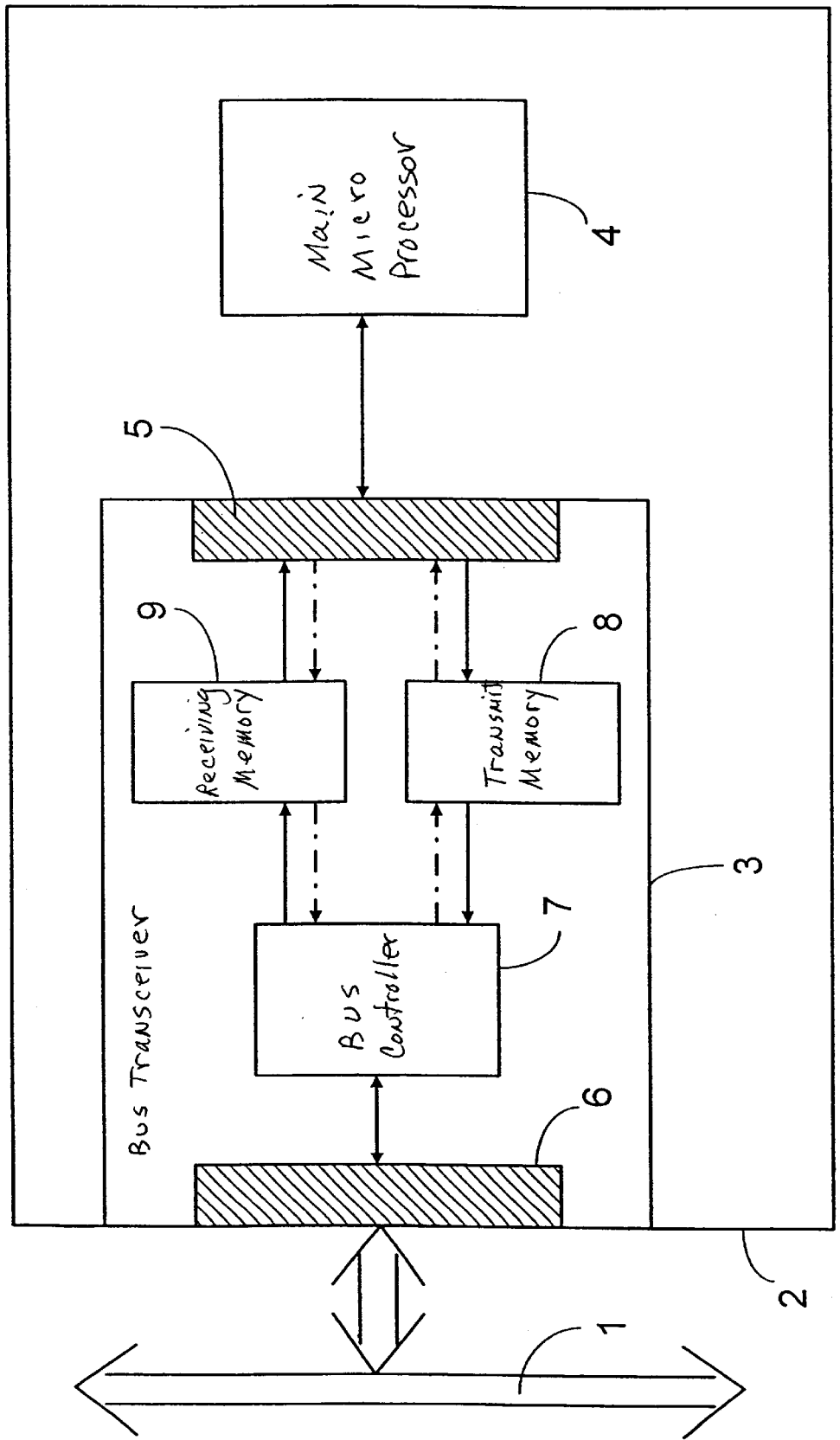
FIG. 1 is a conceptual block diagram of a control unit which communicates via a data bus, according to the invention.

In FIG. 1, a control unit 2 is connected by way of a bus interface 6, as a bus subscriber, to a bus 1. The control unit 2 has a main microprocessor 4 and a processor interface 5 to a bus transceiver unit 3. The bus transceiver unit 3 comprises at least one transmit memory 8, one receiving memory 9 and one bus controller 7. The data paths between the bus controller 7, on the one hand, and the main microprocessor, on the other hand, to the transmit memory 8 and to the receive memory 9 respectively may be either unidirectional (continuous arrows) or bidirectional (additional broken arrows). Read-back paths exist in the case of bidirectional data paths.

Figure 2:
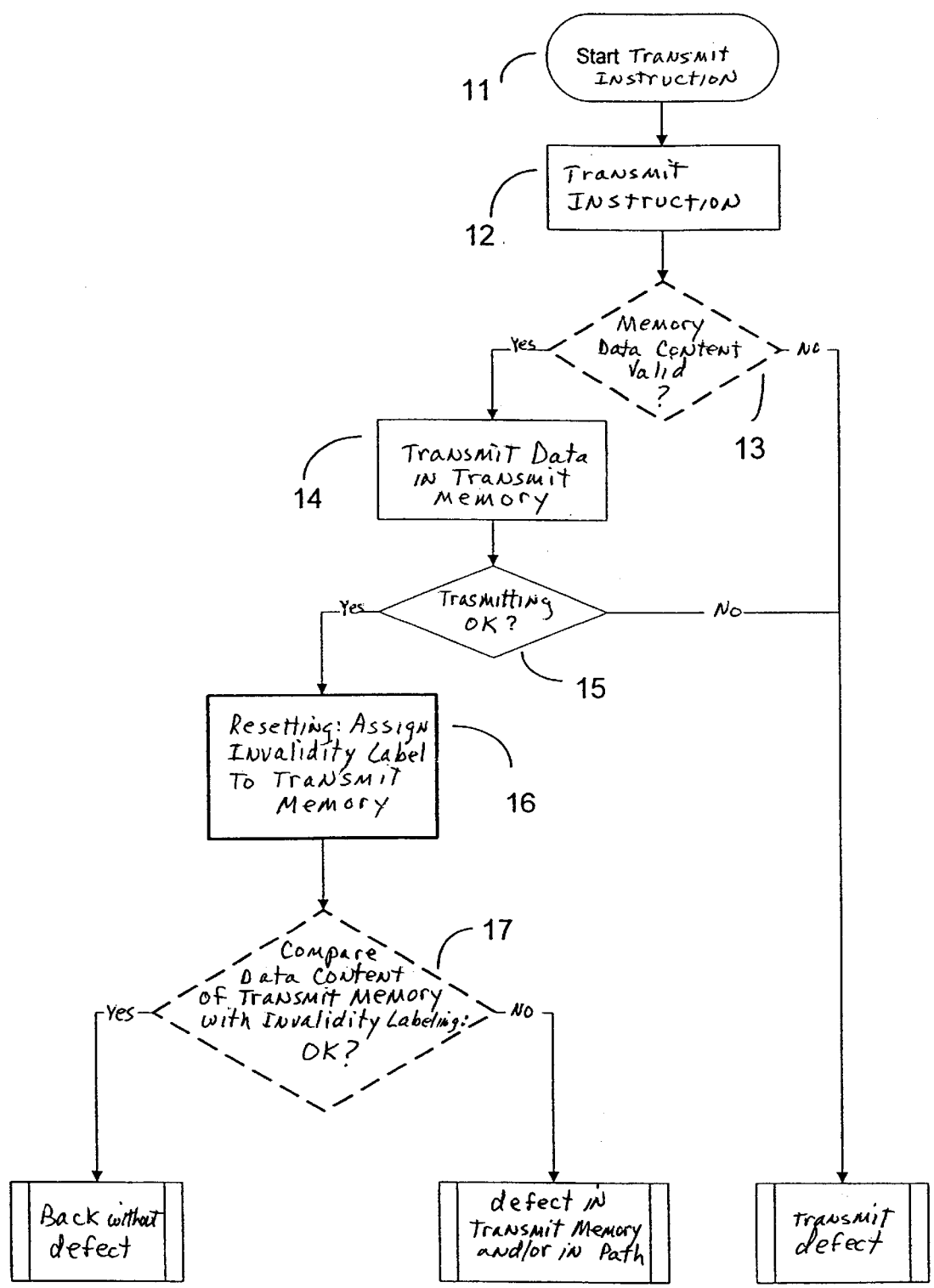
FIG. 2 is a logic flow chart which shows the program-related characteristics important to the invention.

In FIG. 2, the function-related characteristics of the invention are explained on the example of a data output by way of the transmit memory 8. A transmit instruction from the main microprocessor 4 starts in block 11 of the logic flow chart, after the main microprocessor 4 had previously given a command for transmitting defined data into the transmit memory 8. According to block 12, the output of the transmit instruction takes place either in an event-controlled manner or cyclically.

Block 13, which is provided only optionally when a read-back path from the transmit memory 8 to the main microprocessor 4 is provided, checks the data content before the output from the transmit memory 8 to the bus 1 as to whether it is provided with an "invalidity labeling" corresponding to the defined status. If so, the output of the data is prevented and a transmit fault is generated. When no "invalidity labeling" is present, the data are transmitted in block 14.

If it is determined in block 15 that the transmitting has been carried out successfully, block 16 resets the data content of the transmit memory 8 to a defined status in that the data content receives an "invalidity labeling", for example, FF hex in each byte of the transmit memory 8. The "invalidity labeling" preferably is performed by the main microprocessor 4 but can also be carried out by the bus controller 7.

In block 17, the data content is optionally checked, particularly only when a read-back path is present, after the resetting as to whether the "invalidity labeling" is in fact present in the transmit memory 8. If not, a defect is detected and stored, by which a conclusion can be drawn on a defective path and/or on a defective memory.

As a result, a simple system and an effective method are provided for preventing the transmission of apparently valid, for example, aged data, by way of a bus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit comprising:

a main microprocessor; and a bus transceiver unit having a processor interface, a bus controller, at least one transmit memory which transmits data content to a data bus via the bus controller, and one receive memory which receives data content from the bus via the bus controller; and means, operative after each transfer of data content from the transmit memory to the data bus or from the receive memory to the main microprocessor, for resetting the data content of at least one of the transmit memory and the receive memory to a defined status, before the main microprocessor outputs or reads in new data content.

2. The control unit according to claim 1, wherein the data content is reset by the main microprocessor.

3. The control unit according to claim 1, wherein the data content is reset by the bus controller.

4. The control unit according to claim 1, further comprising means for checking the data content after the resetting; wherein a defect is detected if the defined status is not present.

5. The control unit according to claim 1, further comprising means for checking the data content before a next output of data from the transmit memory to the bus or reading-in of data from the receive memory; wherein the output or the reading-in of data is prevented if the defined status is present.

6. The control unit according to claim 1, wherein the defined status is an invalidity labeling.

7. A method for operating a control unit having a main microprocessor and a bus transceiver unit with a transmit memory which transmits data content to a data bus, a receive memory which receives data content from the data bus and a bus controller, comprising:

after each occurrence of an output or read-in of the data content stored in the transmit memory or the receive memory, resetting the data content of the transmit or receive memory, to a defined status; and the main microprocessor outputting or reading in new data content after said resetting.

8. The control unit according to claim 7, wherein the data content is reset by the main microprocessor.

9. The control unit according to claim 7, wherein the data content is reset by the bus controller.

10. The method according to claim 7, further comprising:

checking the data content after resetting; and detecting a defect if the defined status is not present.

11. The method according to claim 7, further comprising:

checking the data content before a next output of data from the transmit memory for communication via the bus or a net reading-in of data to the receive memory; and preventing output or reading-in of data if the defined status is present.

12. The method of claim 7, wherein the defined status is an invalidity labeling.

13. A control unit comprising:

a microprocessor; and a bus transceiver unit comprising a transmit memory which receives data content from the microprocessor and transmits the contents to a bus, wherein the data content of the transmit memory is reset to a defined status after transmitting the data content to the bus;

a receive memory which receives data content from the bus and transmits the data content to the microprocessor, wherein the data content of the receive memory is reset to a defined status after transmitting the data content to the microprocessor.

14. The control unit according to claim 13, wherein the data content is checked after resetting the transmit or receive memory, and a defect is detected if the defined status is not present.

15. The control unit according to claim 13, wherein the data content is checked before a subsequent transmission by the receive or transmit memory, and the subsequent transmission is prevented if the defined status is present.

16. The control unit according to claim 13, wherein the defined status is an invalidity labeling.

* * * * *